(12) United States Patent
Ferger

(10) Patent No.: US 7,227,647 B2
(45) Date of Patent: Jun. 5, 2007

(54) METHOD FOR MEASURING SURFACE PROPERTIES AND CO-ORDINATE MEASURING DEVICE

(75) Inventor: Detlef Ferger, Herborn (DE)

(73) Assignee: Werth Messtechnik GmbH, Giessen (DE)

( * ) Notice: Subject to any disclaimer, the term of this patent is extended or adjusted under 35 U.S.C. 154(b) by 69 days.

(21) Appl. No.: 10/480,646

(22) PCT Filed: Jul. 5, 2002

(86) PCT No.: PCT/EO02/07466

§ 371 (c)(1),
(2), (4) Date: Dec. 29, 2003

(87) PCT Pub. No.: WO03/008905

PCT Pub. Date: Jan. 30, 2003

(65) Prior Publication Data

US 2004/0174537 A1    Sep. 9, 2004

(30) Foreign Application Priority Data

Jul. 16, 2001   (DE) ................................. 101 33 838

(51) Int. Cl.
*G01B 11/24* (2006.01)
*G01B 5/004* (2006.01)

(52) U.S. Cl. ...................... 356/600; 356/609; 356/614; 33/503; 33/559; 250/561

(58) Field of Classification Search ........ 356/600–614; 33/502–504, 1 M, 556–561; 364/559; 250/561, 250/227, 221–222
See application file for complete search history.

(56) References Cited

U.S. PATENT DOCUMENTS 5,251,156 A * 10/1993 Heier et al. .................. 702/167
5,333,386 A *  8/1994 Breyer et al. ................. 33/1 M (Continued)

FOREIGN PATENT DOCUMENTS

DE          19747027 A1 * 10/1998

*Primary Examiner*—Sang H. Nguyen
(74) *Attorney, Agent, or Firm*—Dennison, Schultz & MacDonald

(57) ABSTRACT

A method and apparatus for measuring surface properties of a workpiece in an extremely precise manner by means of a co-ordinate measuring device (10), independently from the material properties of the workpiece. A molded probe element is used which can be displaced along coordinate axes (X, Y, Z), and an optical sensor detects the movement of the probe element on the surface of the workpiece. The optical sensor is an optoelectronic distance sensor, and the molded probe element is displaceably arranged in relation to the distance sensor in such a way that the distance sensor optionally directly measures the surface, or the position of the molded probe element.

7 Claims, 3 Drawing Sheets

U.S. PATENT DOCUMENTS

| | | | |
|---|---|---|---|
| 5,396,712 A * | 3/1995 | Herzog | 33/503 |
| 5,615,489 A | 4/1997 | Breyer et al. | |
| 5,724,745 A * | 3/1998 | Brenner et al. | 33/503 |
| 5,778,548 A * | 7/1998 | Cerruti | 33/503 |
| 5,822,877 A * | 10/1998 | Dai | 33/560 |
| 5,825,666 A * | 10/1998 | Freifeld | 702/153 |
| 5,955,661 A | 9/1999 | Samsavar et al. | |
| 5,996,239 A * | 12/1999 | Ohnheiser | 33/503 |
| 6,158,136 A * | 12/2000 | Gotz et al. | 33/503 |
| 6,163,973 A | 12/2000 | Matsumiya et al. | |
| 6,441,910 B1 | 8/2002 | Christoph | |
| 6,646,750 B1 * | 11/2003 | Christoph | 356/609 |
| 6,651,351 B1 * | 11/2003 | Christoph et al. | 33/503 |
| 6,856,381 B2 * | 2/2005 | Christoph | 356/4.05 |
| 6,927,863 B2 * | 8/2005 | Gurny | 356/602 |

* cited by examiner

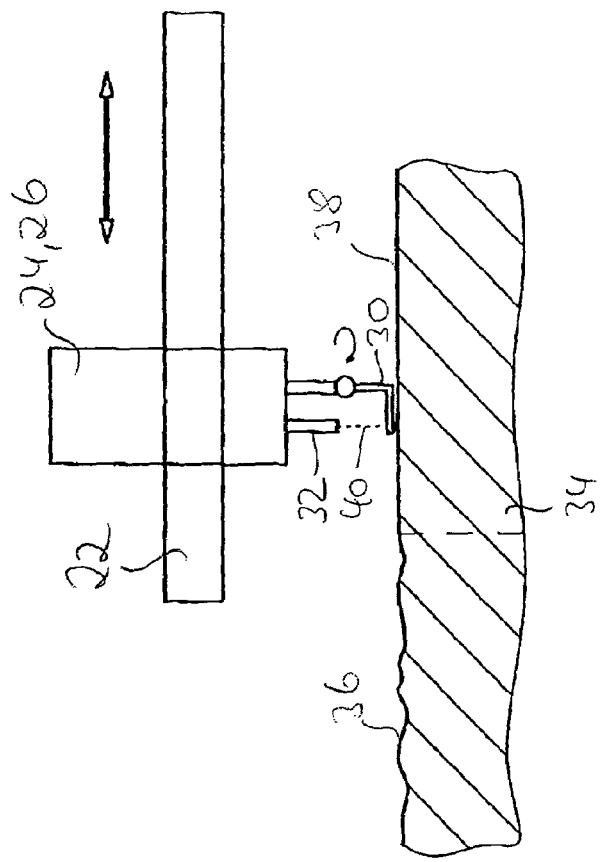
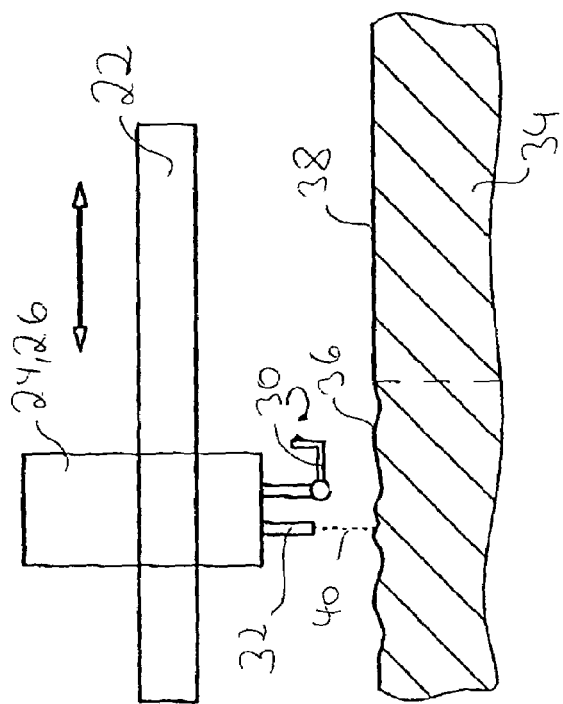

METHOD FOR MEASURING SURFACE PROPERTIES AND CO-ORDINATE MEASURING DEVICE

BACKGROUND OF THE INVENTION

The invention involves a method for measuring surface properties of a work-piece using a coordinate measuring device including a scanning molded element supported on the surface and movable relative to it whose position is directly recorded by an optical sensor or a position at least of a marker directly allocated to the scanning molded element is recorded by an optical sensor. Furthermore the invention involves a coordinate measuring device for measuring surface properties of a work-piece including a scanning molded element movable along the coordinate axis of the coordinate measuring device, as well as an optical sensor recording its motion on the surface of the work-piece.

The determination of surface quality facilitates the assessment of the boundary surface of a work-piece. Moreover scanning section devices can be used whereby, for example, the surface is scanned using a sapphire, diamond or a simple steel tip as a scanning needle. The deflection of the scanning needle can be received inductively or even by laser interferometry.

Thus, according to the data processing journal Technician 5(96): 13–20, a scanning tip is passed over a sample surface to determine surface roughness. The scanning tip proceeds from a cantilever. A laser beam is directed toward the exterior surface of the cantilever whose reflection is recorded by means of a PSD sensor. The laser and the PSD sensor consequently form an optical sensor.

A method for measurement magnitude determination of a surface of a test specimen with a scanning element supported on the surface is described in DE 198 24 107 A1, whereby the position of the scanning element is directly recorded with an image-processing sensor, or a position of at least a collimator mark directly allocated to the scanning element is recorded by an image-processing sensor and the surface measured magnitude is ascertained, taking the relative motion between the test specimen and the scanning element into consideration.

Methods and devices for ascertaining the surface quality of work-pieces are described in the data processing journal: T. E. Pfeiffer, Finishing Measurement Techniques, Oldenbourg Publishers, Second Edition, p. 289 to 298.

SUMMARY OF THE INVENTION

The present invention is based upon the problem of the further development of a method and a coordinate measuring device of the type mentioned at the beginning such that surface properties can be measured extremely precisely, whereby measurements can also be conducted in soft surface areas or those of great roughness without the danger of damage or undesirably high measurement inaccuracies resulting.

The problem is basically solved in the invention by a method of the type mentioned at the beginning in that an optical-electronic ranging sensor is used, with which the surface properties can be electively measured directly or by means of the position of the scanning molded element or the mark allocated to this is indirectly or directly measured.

In the invention, a method is made available with which surface properties can also be measured with sufficient precision, if the surface is too soft for a scanning element supported upon it, or a sufficient measuring point density cannot be obtained with a scanning element, for example, due to excessive roughness. For in this case, the scanning element is swiveled out of the beam path of the ranging sensor and the surface is measured directly with it.

With regard to the scanning molded element it can be a matter of a scanning needle of known construction. A fiber scanner operating in an optical-tactile manner can, however, also be used, the position of which can be measured with sub-pixel accuracy using an image processing sensor, such as a CCD camera. In this case, the ranging sensor serves as a light source for the optical-tactile sensor. On the other hand, when using a typical scanning needle, the ranging sensor itself can be used as a measuring sensor.

A sensor operating according to the video autofocus method, the laser autofocus method or the Foucault cutting principle can be used as a ranging sensor. Moreover the ranging sensor can be combined with the image-processing sensor.

The scanning molded element can be positioned in the beam input of the ranging sensor or be removed from it by means of an alternate interface, namely by positioning in front of the optical ranging sensor or being deposited in a parking station. Moreover an interface that is used in connection with the existing scanning system of the coordinates measuring device can be used as an alternate interface.

A coordinate measuring device of the type mentioned at the beginning is distinguished by the optical sensor being an optical-electronic sensor and by the ranging molded element being adjustably arranged in relation to the ranging sensor, so that it measures the surface or the position of the scanning molded element, as desired.

Moreover the scanning molding element can be a scanning needle or an optical-tactile sensor, whereby in the latter case a ranging sensor and an image-processing sensor can be combined. The ranging sensor in particular is one operating according to the Foucault cutting principle or a laser ranging sensor.

BRIEF DESCRIPTION OF THE DRAWINGS

Further details, advantages and features of the invention emerge not only from the claims, the features to be inferred from these (by themselves and/or in combination), but also from the subsequent description of the preferred execution model based on the drawings. Shown are:

FIG. 2 Illustrates a first operating mode of the coordinate measuring device in accordance with FIG. 1, FIG. 3 Illustrates a second operating mode of the coordinate measuring device in accordance with FIG. 1, FIG. 4 Illustrates a third operating mode of the coordinate measuring device in accordance with FIG. 1 and FIG. 5 Illustrates an overhead view of an object to be measured.

DETAILED DESCRIPTION OF THE PREFERRED EMBODIMENTS

Figure 1:
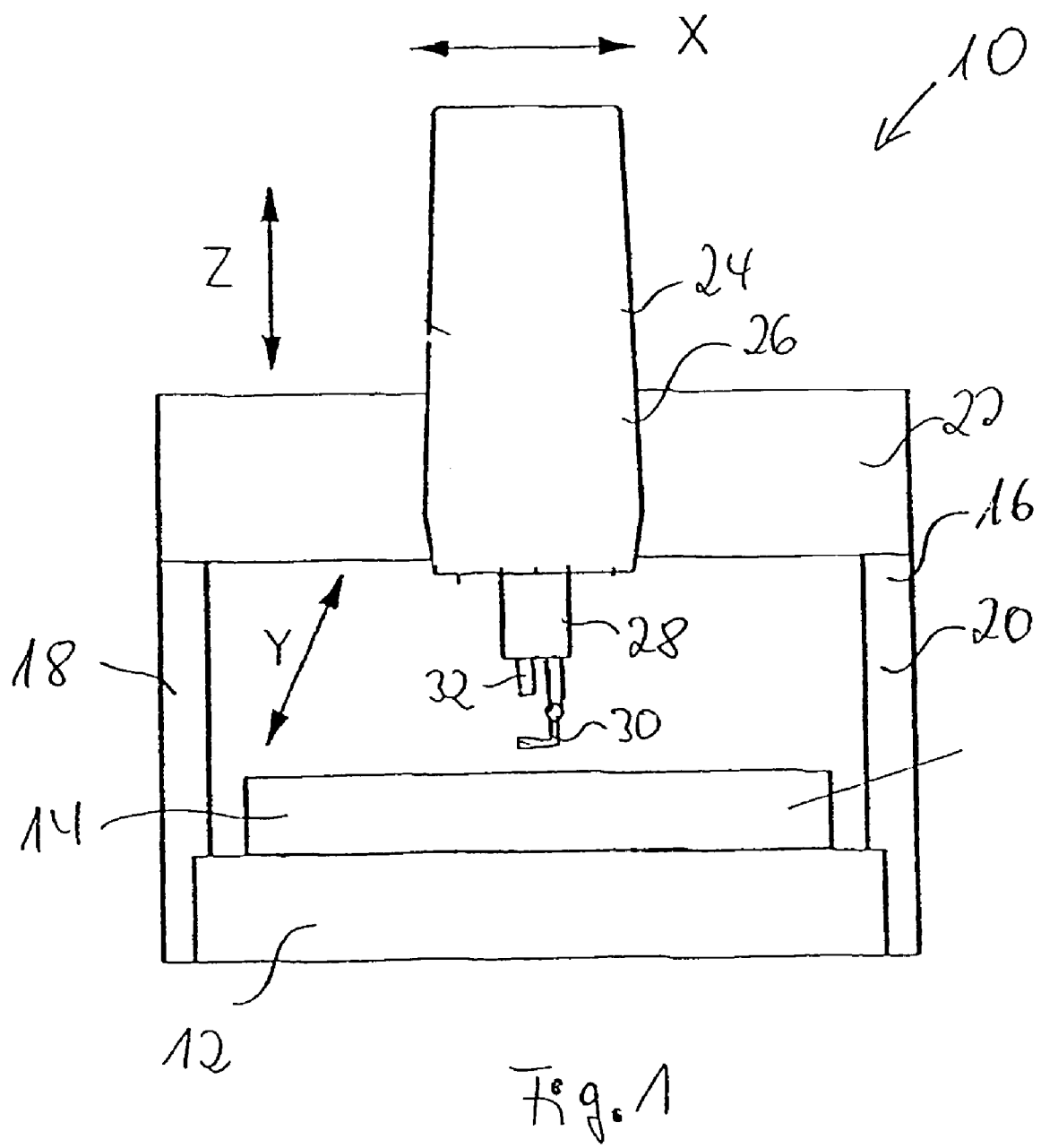
FIG. 1 Illustrates a basic representation of the coordinate measuring device.

In principle a coordinate measuring device 10 with, for example, a base frame 12 made of granite with a measuring table 14 can be discerned from FIG. 1 in which a work-piece, which is not depicted, can be arranged to measure its surface properties, such as roughness.

A portal 16 adjustable in the Y direction lies along the base frame. For this, columns or posts 18, 20 are braced sliding on the base frame 12. A traverse 22 proceeds from the columns 18, 20 along which, thus in the X direction, a cradle 24 is adjustable which for its part accommodates a spindle sleeve or column 26 which is adjustable, in the Z direction. A scanning molded element 30 proceeds from the spindle sleeve or column 26 or an alternate interface 28 which slides along the work-piece for the determination of the surface properties in order to be able to measure the position of the scanning element or its scanning tip. A ranging sensor 32 is aligned on this to measure the motion of the scanning molded element, and the scanning molded element 30 is correspondingly deflected as a function of, for example, the roughness of the surface of the work-piece, and consequently the distance to the ranging sensor 32 is altered so that as a result of this the surface property can be measured by the distance sensor.

It can be a matter of a scanning needle with the scanning element 30, which, for example, can be made of metal, sapphire or diamond. Reference is hereby made to sufficiently known techniques. In the case of the scanning molded element 30, however, it can be a question of an optical-tactile fiber scanner as this, for example, is described in WO 98/57121, whose disclosure is explicitly referenced.

It should be noted with respect to the ranging sensor 32 that in particular it here is a matter of one operating according to the video autofocus method, the laser autofocus method and the Foucault cutting principle.

If an optical-tactile scanner is used, the coordinate measuring device has an image processing sensor such as a CCD camera with image editing and transfer, as well as image processing in order to ascertain position changes of the scanner and the resulting surface properties directly from the shifting of the image on the CCD field to the extent, that a change in position does not take place in the direction of the optical axis of the image processing sensor. In the process an arrangement can be used such as is basically derived from DE 198 24 107 A1, whose disclosure is likewise expressly referenced.

To the extent that measurement cannot take place with the scanning molded element 30, either because the surface is too soft and consequently deformations or damage can occur on this due to the sliding along of the scanning molded element 30, or because of the surface geometry, for example, the roughness would not make measurements with the molded scanning element 30 possible, the scanning molded element 30 is swiveled out of the beam path of the ranging sensor 32 in order to measure directly with this.

This is clarified in principle in FIGS. 2 and 3. A work-piece 34 with surface sections 36, 38 can be discerned from FIGS. 2 and 3 which have properties deviating from each other to the extent, that the left section 36 in the drawing has such great roughness that a scanning with the scanning molded element 30 is not possible. In this case, the scanning molded element 30 is swiveled out of the beam path 40 of the ranging sensor 42 and measurement takes place directly with the ranging sensor 42. On the other hand, the roughness in surface region 38 is so small that measurement with the scanning molded element 30 is possible. In this case, the scanning molded element 30 is swiveled into the beam path 40 of the ranging sensor in order to ascertain its position through the ranging sensor 32.

If an optical-tactile scanner is used, the ranging sensor 32 can be combined with the image-processing sensor. Independent of this, the ranging sensor 32 does not perform the function of a measuring sensor when an optical-tactile sensor is used, but instead that of an illumination.

Figure 4:
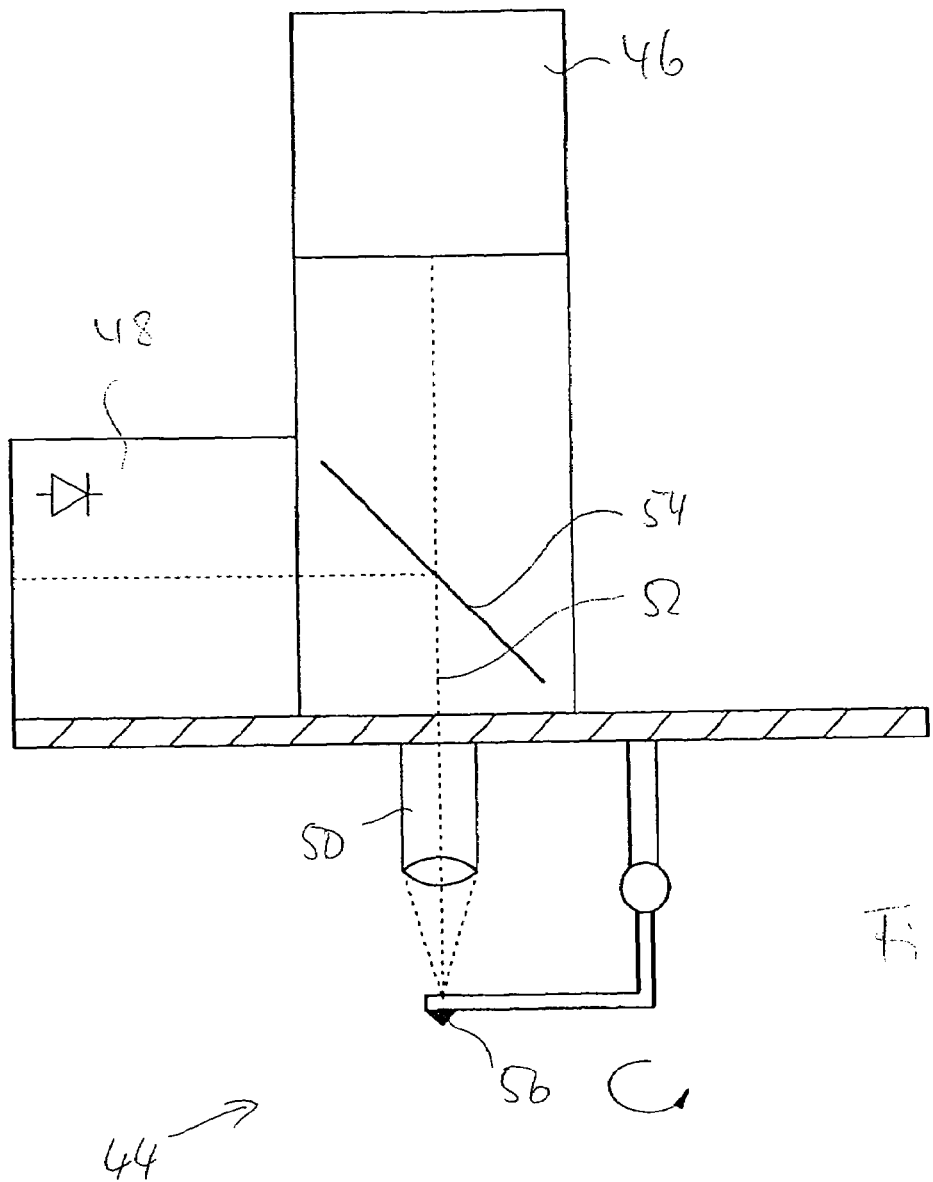
Figure 5:
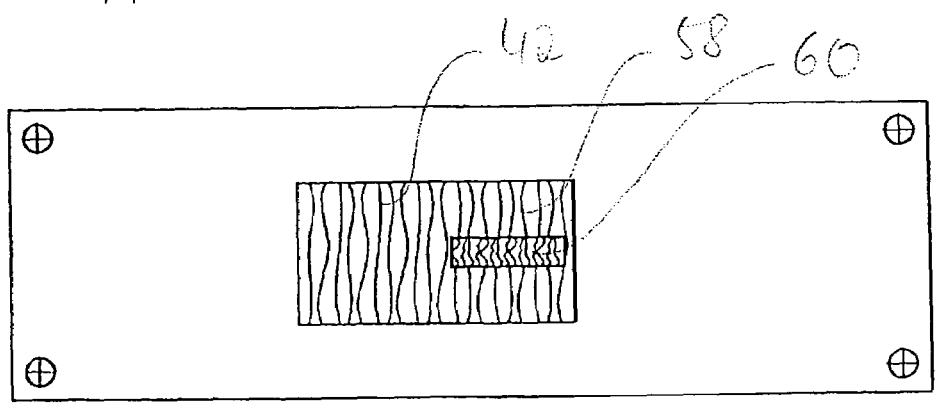

A further refinement of the theory of the invention is to be explained on the basis of FIGS. 4 and 5. An optical sensor system made of an image-processing sensor 46 and a laser ranging sensor 48 is used in addition to a tactilely measuring sensor 44 to measure a region 42 of a work-piece. Consequently the image-processing sensor 46 is present as a complement to the laser ranging sensor 48 when comparing with the execution models of FIGS. 1 and 3. A joint optical system 50 is allocated to the ranging laser sensor 48 as well as the image-processing sensor 46, whereby the beam path 52 is transmitted through a divider mirror 54 to the laser ranging sensor 48 or the image processing sensor 46.

The image-processing sensor 46 as well as the laser ranging sensor 48 are in a position to measure directly on the region 42 of the work-piece. With the optical scanning method, the disadvantage can moreover exist that the results are falsified by surface properties. It is possible to measure alternatively optically and mechanically with the same apparatus configuration by swinging on the additional tactile sensor 44 or its scanning needle 56 for surface measurement.

In the execution model the area 42 to be measured has identical surface properties in its larger surface 58 as well as in a narrow slot 60. Hence one can first measure area 58 with the tactilely measuring sensor 44. Measuring can take place at the same place with the optical sensor 48 so that the optical method is connected to the mechanical method on the current material surface and is consequently calibrated. In other words, a calibration takes place for the non-contact optical measurement by mechanically scanning measurement. Then the slot region 60, which is hardly accessible to the tactilely operating sensor 44 or not accessible at all, can be measured with the optical sensor, especially the laser ranging sensor 48.

In particular the location of the work-piece or region 42 by survey takes place with the image-processing sensor, in contrast to which the surface properties of area 42 are measured with the laser ranging sensor 48.

The invention claimed is:

1. A method for measuring the surface characteristics of a work piece with a coordinate measuring device comprising: a sensing probe needle supported on a base and being movable relative thereto and an opto-electronic distance sensor for direct measuring of the surface characteristics, wherein the opto-electronic distance sensor optionally measures the surface characteristics of the work piece directly so that the position of the distance sensor and the sensing probe needle or a marking allocated thereto are measured to determine the surface characteristics of the work piece, wherein the opto-electronic distance sensor functioning according to a video auto-focus process, a laser auto-focus process, and a Foucault knife-edge principle are used, wherein an image processing sensor is combined with the opto-electronic distance needle, and wherein the sensing probe element is positioned via a change-over interface in the beam path of the opto-electronic distance sensor.

2. The method of claim 1, wherein said sensing probe element is an opto-tactile fiber scanner.

3. The method of claim 1, wherein the change-over interface such a one is used as being employed for a sensing system present in a coordinate measurement device.

4. A coordinate measuring device for measuring of surface characteristics of a work piece comprising: a sensing probe needle portable along coordinate axes (X, Y, Z) of the coordinate measuring device, and an opto-electronic distance sensor, wherein the sensing probe needle is adjustable in relation to the opto-electronic distance sensor so that the position of the distance sensor and the sensing probe needle or a marking allocated thereto are measured to determine the surface characteristics of the work piece, wherein the opto-electronic distance sensor is a sensor functioning according to a laser auto-focus process, a video auto-focus process, and a Foucault knife-edge principle, and wherein the coordinate measuring device has an image processing sensor that can be combined with the opto-electronic distance sensor.

5. The coordinate measuring device of claim 4, wherein the sensing probe element is a fiber probe functioning opto-tactile.

6. The coordinate measuring device of claim 4, wherein the sensing probe element is adjustable via a change-over interface.

7. The coordinate measuring device of claim 6, wherein the change-over interface is a change-over interface used for present sensing systems in the coordinate measurement device.

* * * * *